May 12, 1931.  B. S. STEWART  1,804,520
CONCENTRIC HINGE CONNECTION FOR AIRPLANE CONTROL SURFACES
Filed March 30, 1928
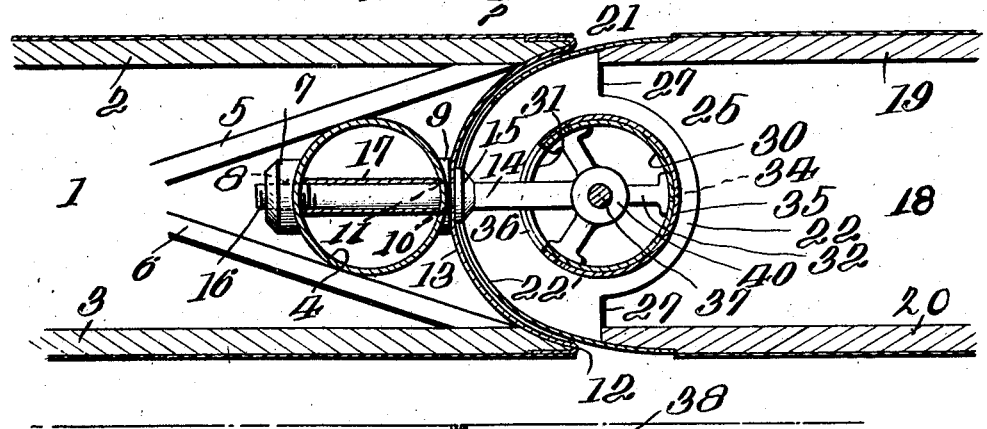
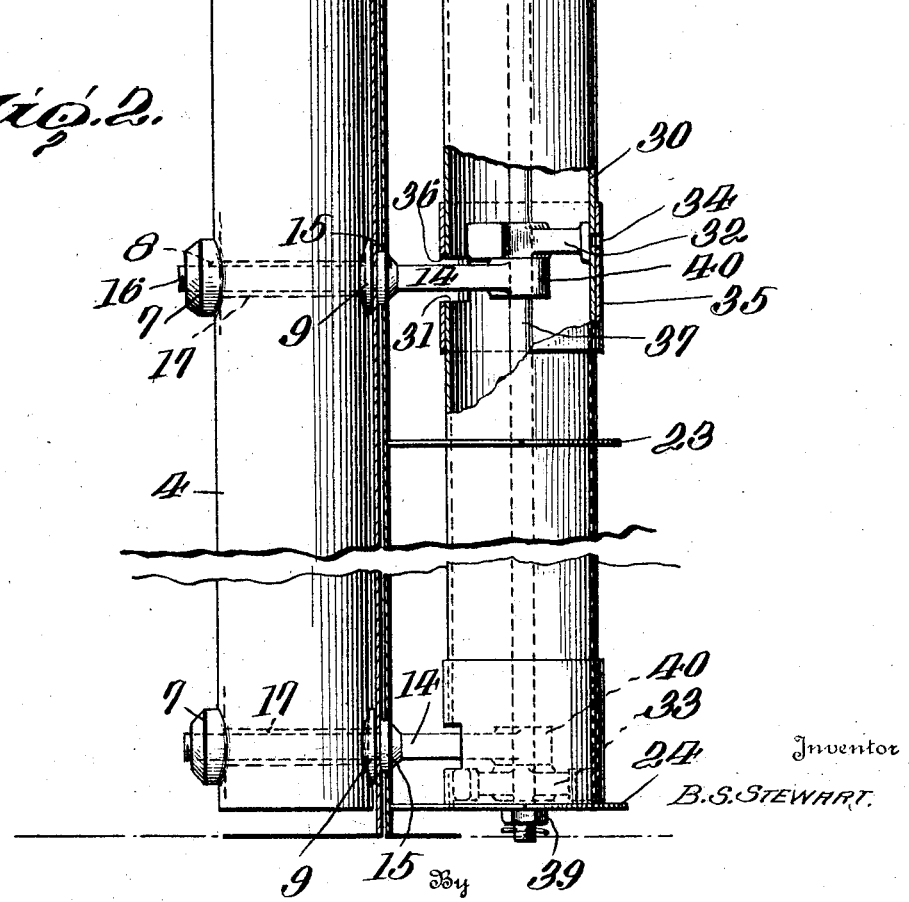
Inventor
B. S. STEWART.
Attorney Patented May 12, 1931

1,804,520

UNITED STATES PATENT OFFICE

BAYARD S. STEWART, OF HAZLETON, PENNSYLVANIA, ASSIGNOR OF FOUR-FIFTHS TO GENERAL AIRCRAFT CORPORATION, OF HAZLETON, PENNSYLVANIA, A CORPORA- OF DELAWARE

CONCENTRIC HINGE CONNECTION FOR AIRPLANE CONTROL SURFACES

Application filed March 30, 1928. Serial No. 265,944.

My invention relates to improvements in concentric hinge connections for airplane control surfaces.

The object of my invention is to provide a hinge connection which permits the control surface to rotate about a point concentric with the hinge tube, so constructed that the convex semi-circular leading edge of the movable control surface fits into a concave semi-circular trailing edge of the fixed surface, thus causing a comparatively close connection between the fixed and control surface and avoiding excessive gap between the two, and insuring an unobstructed passage of the air flow along the stream line surface of the fixed and control surface.

Another object of my invention is to provide a hinge which strengthens the forward or leading edge of the control surface, and at the same time providing means whereby the hinge connection can be readily made and assembled or disassembled for repairs, when it is necessary to replace the control surface.

A further object of my invention is to provide a very strong hinge connection which is comparatively simple and cheap in construction and having certain details of structure and combination of parts hereinafter more fully set forth.

In the drawings,

Figure 1 is a plan section of the rudder connection to the fin showing the trailing edge of the fin and the leading edge of the rudder; and Figure 2 is a side elevation, partly in section, of the same.

In the embodiment of my invention as herein shown, 1 is the primary structure or relatively fixed surface, 2 and 3 being the rib capstrips braced by the struts or braces, 5 and 6, which as shown in this form of structure extend diagonally from a point adjacent the capstrips forwardly, and secured thereto in the usual manner. Arranged between these braces is the supporting rear spar 4 which may be welded or otherwise secured to the braces, and which serves as a support for the hinge of the control surface and serves as the usual principal member for the rear edge of primary structure 1.

The supporting tube 4 has welded to its front or forward side the threaded collars 7 which are spaced apart, at distances depending upon the size of control surface. These collars are provided with tapped holes 8 registering with holes in the tube, and the threads in the tube and collars are continuous. The rear or back edge of the tube 4 is provided with collars 9 which are arranged opposite the collars 8, and provided with holes 10 registering with holes 11 in the tube 4.

The rear concave edge of the fixed surface between capstrips 2 and 3 is made of aluminum sheet 12 which is curved inwardly between outer surfaces and arranged in an arc of a circle as indicated at 13, and which engages and rests against the rear faces of the collars 9. This curved portion of the sheet 12 is provided with holes opposite the holes in the collars 9 and through which pass the hinge bolts 14, said bolts having annular shoulders 15 adapted to engage the sheet 12 and clamp it against the collars 9.

The bolts 14 pass through the collars 9 and the tube 4, and have their ends screw threaded as indicated at 16, and screwed through the collars 7 at the forward face of the tube 4. Surrounding the bolts 14, within the tube 4, are tubular sleeves 17 adapted to engage the inner opposite faces of the tube whereby the bolts may be tightly clamped to the tube, and which sleeves prevent the walls of the tube from being collapsed or distorted.

The control surface 18, like the fixed surface 1, is supported by capstrips 19 and 20 which may be braced in any desired manner. The forward end of the control surface between its outer surfaces, is made of aluminum plate 21 which is convex in a little greater arc of a circle than the plate 13, and extends therein as clearly shown in Figure 1 of the drawings. The plate 21 is provided with slots 22' through which the bolts 14 and the shoulders 15 pass, as the control surface moves on its hinge.

Welded to the inner face of the sheet 21 are the steel disks 22, 23 and 24, which are cut away as indicated at 26 and forming the shoulders 27, to which capstrips 19 and 20 are welded or otherwise fastened. Said disks are welded to the hinge tube 30 or sleeves 35 as may be appropriate, which are provided with slots 31 through which the hinge bolts 14 pass, and whereby the bolts may have a free movement perpendicular to hinge axis as will be later described. Welded within the tube 30 are the spiders or disks 32 and 33 and said welded connection is made through holes 34 in the tube. Surrounding the hinge tube opposite each spider or disk is a reinforcing sleeve 35 which is welded to the tube and is provided with slots 36 corresponding to the slots 31 in the tube, and through which the hinge bolts 14 pass and have a free movement therein.

Extending centrally through the tube 30 is hinge rod 37 for which spiders 32 and 33 form supports or bearings. Rod 37 extends out through the two end disks 22 and 24 or has independent and separate plates at its ends screw threaded to receive the nut 39, 38 being a bolt head on the rod, whereby the rod is held in the tube. This rod passes loosely through the eyes 40 carried by the hinge bolts 14, whereby the control surface is free to oscillate on the hinge bolts 14.

By this structure herein shown it will be seen that the control surface is pivotally connected to the fixed surface or primary structure at two or more hinge points and it will be understood that any desired number of hinge bolts can be used and thus produce a strong hinge connection, the number of bolts depending upon the area and hinge moment of the control surface. It will also be seen that there is practically no gap between the trailing edge of the fixed surface and the leading edge of the control surface, thus insuring an unobstructed passage of the air flow along the combined stream line surfaces of the fixed surface and control surface.

The operating means of the control surface is not shown, as any operating means may be employed as this forms no part of my invention.

From the foregoing description it will be seen that I have provided a novel construction of hinge for connecting a control surface to the primary structure or relatively fixed surface, as for example the hinge may be used to attach an aileron to a wing of an airplane, the wing in this case being the fixed surface or primary structure.

It also can be used for a rudder which is the control surface and may be connected through the hinge to the fin and the rear end of the fuselage or rudder post, in which case the fin is the fixed surface and the rudder post or the rear end of the fuselage is the primary structure or it may be used as an elevator which is the control surface for connecting the same to a stabilizer which then forms the primary structure or relatively fixed surface inasmuch as the stabilizer has a very small and infrequent movement.

While I have shown certain embodiments of my invention, I do not wish to limit myself to any particular use for this construction as it can be used for various purposes for connecting the relatively fixed surface to a control surface in an airplane in various ways.

What I claim is:

1. In an airplane, the combination with the primary structure, of a control surface, pivot eye bolts secured within either the primary structure or control surface and having their eyes pivotally mounted in the spar of the other surface.

2. The combination with an airplane fixed surface having a tube rigidly secured within the rear edge thereof, pivot bolts rigidly secured to said tube and extending into the spar of the leading edge of control surface and pivotally mounted therein.

3. The combination with an airplane fixed surface, a tube rigidly secured within the trailing edge of the wing or other fixed surface, pivot bolts rigidly secured to the tube, and extending within the front spar of the control surface, and pivotally mounted on a rod supported therein.

4. The combination with an airplane fixed surface, of a control surface, pivot bolts rigidly secured to a spar rigidly carried within either the fixed surfaces or the control surface and having their opposite ends pivotally mounted within a tubular spar of the other surface.

5. In an airplane, the combination with the primary structure provided with a fixed surface having a concave metal sheet closing the trailing edge of the fixed surface, pivot bolts rigidly secured within the primary structure and extending outwardly through the sheet, a control surface having a sheet closing the forward end and extending into the concave sheet carried by the primary structure and having slots through which the pivot bolts pass, and means within the control surface for pivotally supporting the pivot bolts.

6. The combination with an airplane fixed surface, a sheet closing the trailing edge of the fixed surface, and having a concave outer edge, and a control surface having a sheet closing the leading edge thereof, and having a convex edge extending into the concave edge of the sheet carried by the fixed surface, and pivot bolts rigidly carried by the fixed surface, and passing through the sheet and having their trailing edges pivotally mounted within the control surface.

7. The combination with an airplane fixed surface, of a control surface, a tube rigidly secured within the trailing edge of the fixed surface, a sheet closing the trailing edge of the fixed surface and having a concave outer edge, pivot bolts rigidly supported by the tube and clamping the sheet thereto, a sheet closing the leading edge of the control surface and having a convex outer edge extending into the concave edge of the sheet carried by the fixed surface, and means for pivotally mounting the outer ends of the bolts within the control surface.

8. The combination with an airplane having a primary structure provided with a fixed surface, having a concave metal sheet extending within and closing the trailing edge of the fixed surface, a control surface having a convex sheet closing the leading edge thereof and extending within the concave sheet carried by the fixed surface, and pivot bolts rigidly secured within the primary structure and extending outwardly through the sheets and pivotally mounted within the control surface.

9. The combination with an airplane fixed surface, having a concave metal sheet closing the trailing edge of the fixed surface, a control surface having a convex sheet closing the leading edge and extending within the concave sheet carried by the fixed surface, a tube carried by the inner face of the convex sheet within the control surface, a bolt held centrally within said tube and pivot bolts rigidly carried by the fixed surface, and having their opposite ends pivotally supported upon the rod carried by the tube within the control surface.

10. The combination with an airplane fixed surface, having a concave metal sheet closing trailing edge thereof, a tube within the fixed surface, pivot bolts rigidly secured to the tube and clamping the concave metal sheet thereto, a control surface having a convex sheet closing the leading edge thereof and extending into the concave sheet carried by the fixed surface, a tube rigidly carried by the inner face of the convex sheet within the control surface, a rod securely and centrally supported within the tube within the control surface, and upon which the pivot bolts are pivotally mounted.

11. The combination with an airplane structure provided with a surface, having a concave metal sheet closing the trailing edge thereof, a tube rigidly secured within the surface, pivot bolts passing through the concave sheet and clamping it to the tube, and rigidly supported by the tube, a control surface having a convex sheet closing the leading edge thereof, and extending into the concave sheet carried by the surface of the primary structure, a tube rigidly carried by said convex sheet, spider or disks within said tube, a rod rigidly supported by said spider or disks and said pivot bolts passing through slots in the convex sheet and tube carried by the control surface, and pivotally mounted upon the rod within the tube.

12. The combination with an airplane fixed surface having a tubular spar rigidly secured within the trailing edge of the fixed surface, a control surface having a tubular spar at its front edge, bolts rigidly mounted within the tubular spar of the fixed surface extending into the tubular spar of the control surface and pivotally mounted therein.

13. In an airplane, the combination with a surface having a tubular spar secured therein, bolts extending transversely through said tubular spar having eyes at their ends, a control surface having a tubular spar at its front edge, said bolts extending into the tubular spar of the control surface and a rod held centrally within the tubular spar of the control surface upon which said bolts are pivotally mounted.

14. The combination with an airplane fixed surface, of a control surface, spaced tubular spars secured within said surfaces, pivot bolts rigidly secured to one of said tubular spars and extending into the other tubular spar and a rod held within one of said tubular spars upon which said bolts are pivotally mounted.

15. In an airplane the combination with a fixed surface, of a control surface concentrically pivoted within the rear edge of said fixed surface, said surfaces having tubular spars and bolts fixed in one of said tubular spars and extending within the other tubular spar and pivotally mounted therein.

16. The combination with an airplane fixed surface, a spar rigidly secured within the rear edge of the fixed surface, pivot bolts rigidly secured in said spar, of a control surface having a tubular spar rigidly secured within the forward end thereof and a pivot rod supported within the tubular spar and upon which are mounted the pivot bolts.

In testimony whereof I hereunto affix my signature.

BAYARD S. STEWART.